United States Patent [19]

Wellendorf et al.

[11] 4,276,567

[45] Jun. 30, 1981

[54] RECORDING LINE ELEMENTS

[75] Inventors: Klaus Wellendorf, Heikendorf;
Gerhard Sing, Raisdorf, both of Fed.
Rep. of Germany

[73] Assignee: Dr.-Ing Rudolf Hell GmbH, Kiel,
Fed. Rep. of Germany

[21] Appl. No.: 59,560

[22] Filed: Jul. 23, 1979

[30] Foreign Application Priority Data

Aug. 5, 1978 [DE] Fed. Rep. of Germany ....... 2834456

[51] Int. Cl.³ ............................................... H04N 1/40
[52] U.S. Cl. ..................................... 358/280; 358/80;
358/283; 364/515
[58] Field of Search .......................... 358/280, 283, 80;
364/515

[56] References Cited

U.S. PATENT DOCUMENTS

| | | | |
|---|---|---|---|
| 3,657,472 | 4/1972 | Taudt | 358/75 |
| 3,725,574 | 4/1973 | Gast | 358/298 |
| 4,184,206 | 1/1980 | Harano | 358/280 |
| 4,185,304 | 1/1980 | Holladay | 358/283 |

*Primary Examiner*—Howard W. Britton
*Attorney, Agent, or Firm*—Brisebois & Kruger

[57] ABSTRACT

The invention is applicable in the sphere of the preparation of printing blocks or forms by means of electronic color scanners. The recording of line elements (lettering, signals, edge spike, etc.) by such scanners is concomitantly performed by selective energization of separate recording beams with greater line resolution than half-tone recording. Without losing time during recording, a stair-shaped distortion of smooth line contours is reduced in such degree that it no longer makes itself felt in troublesome manner in practice.

2 Claims, 6 Drawing Figures

RECORDING LINE ELEMENTS

BACKGROUND OF THE INVENTION

The present invention relates to methods of recording line elements such as lettering, frame lines, signets, edge spikes etc., in the exposure of film for the production of printing blocks or formes, and generally seeks to improve the methods existing today in the art.

Electronic appliances, so-called scanners, which perform color correction and screening i.e. the division of the images or of whole pages into picture elements as required for printing purposes, are applied in increasing degree to obtain the colour separation for multi-colour printing, apart from the conventional process. Letters, frame lines, signets, edge spikes, frames etc., are very frequently line images contained in such pictures or pages. If such line image elements were simply to be set up in screen form together with the continuous-tone pictures, the screen superimposition on particular contours would cause a stair-shaped distortion of the line contour which had been smooth in the original, which has an unacceptably disturbing effect in printed reproduction. The color separations are now commonly obtained in such manner that only the continuous-tone pictures are set up in screen form in electronic instruments or cameras. These half-tone color separations are then mounted together with a film which bears the non-screened line image. An intermediate negative of this "montage" is produced on a third film. This is copied again and provides a colour separation which then bears the combination of half-tone pictures and non-screened line images and is utilised for printing block production. It is thus mandatory to follow this procedure, which is costly in respect of equipment and time, which complementarily also sets up considerable uncertainty in the process as a whole because of the numerous copying processes, if it is wished to retain the smooth outlines of the line drawing in the half-tone pictures as far as the printing block.

It may well be possible to improve the line reproduction in the electronic instruments by scanning both data, namely continous-tone as well as line drawings, as well as recording these, with multiple line resolution: for example doubled or tripled. At a predetermined recording speed, the processing period would increase in step with the increase in resolution, which is equally unacceptable for practical operation. Moreover, a demand for increased storage arises upon storing whole images.

It is a specific object of the invention to avoid or minimise the drawbacks referred to and to establish a method for inserting line images into the half-tone color separations with improved reproduction of the contours, in scanners.

SUMMARY OF THE INVENTION

This and other objects are achieved by obtaining the control data for selective energisation of the separate recording beam for each dot scanned, by comparison of the data stored for a scanned dot with the stored data of its surrounding dots.

In an electronic apparatus for production of color separations, the line image data are scanned at the same time as the scanning of the continous-tone picture on a special model or original, or upon delivery from an electronic image store, that is to say with the same line resolution as the scanning of the continuous-tone picture, in accordance with the invention. In accordance with the invention however, the scanning values of the line data are fed to a special circuit which stores the contents of several adjacent scanning lines and at each scanned dot obtains improved intermediate values by comparison with the environs of the dot. These values are fed to a recording element which incorporates several selectively energisable recording beams. The improved line data are fed in accordance with the invention to a recording element of this nature (e.g. described in U.S. Pat. No. 3,725,574) which is normally applied for half-tone recording for production of the screen dots of different size and shape, in such manner that they are incorporated in the half-tone screen data. The line resolution may nevertheless at the same time still be coarser than the resolution applied for production of the half-tone screen dots. For example, it is possible for the purpose of producing the screen dots, to make use of six selectively energised recording beams within a recorded line, which are combined in pairs for line recording, so that the tripled line resolution of the half-tone recording screen is the result for the line recording operation. For less ambitious needs, a combination of 2×3 recording beams may nevertheless still be advantageous, which corresponds to doubling the resolution of the half-tone screen in the line recording operation.

Although the recording of line images is performed almost exclusively for other printing processes (for example in textile printing), the action of incorporation into a half-tone screen picture is evidently omitted; nevertheless, the inventively improved recording of the line data may logically be performed without loss of time.

BRIEF DESCRIPTION OF THE DRAWINGS

In order that the invention may be more clearly understood, reference will now be made to the accompanying drawings which show certain embodiments thereof by way of example and in which.

DETAILED DESCRIPTION OF PREFERRED EMBODIMENTS

Figure 1:
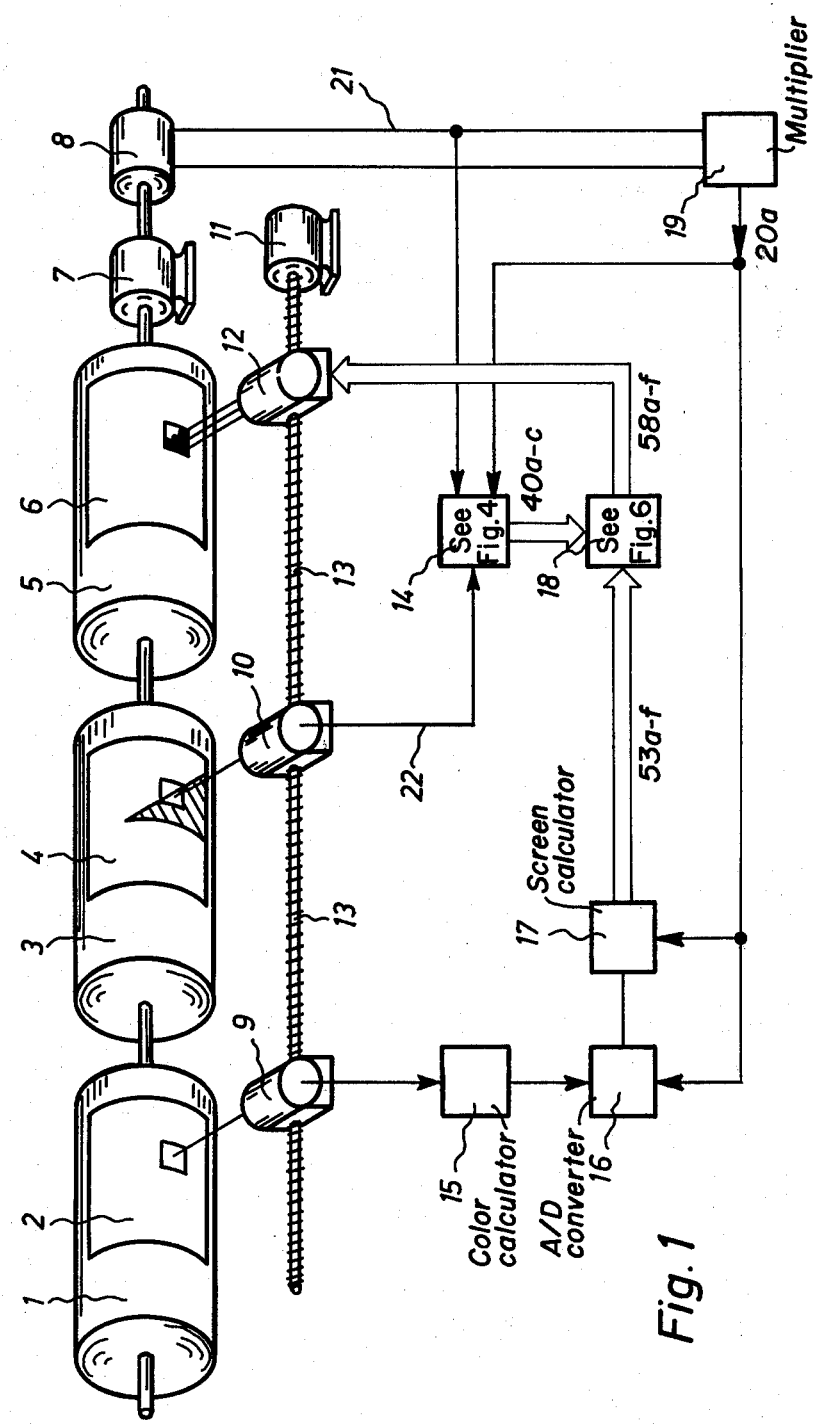
FIG. 1 shows a diagrammatical illustration of the incorporation of a system according to the invention into the fundamental structure of an electronic apparatus for the production of color separations.

Referring now to the drawings, FIG. 1 shows the principle of an electronic apparatus for production of color separations wherein is incorporated a circuit 14 for improving line recording in accordance with the invention. An apparatus of this kind comprises a scanning cylinder 1, which carries the continuous-tone data 2. Another scanning cylinder 3 bears the line data 4. The combined, colour-corrected and screened delivery product 6 is recorded on another cylinder 5 in the form of a color separation for further processing for production of printing blocks. For example, this may be performed by means of light beams on photosensitive film. All three cylinders 1, 3, 5 are driven at identical speed of revolution by a motor 7. A scanning element 9 for scanning the continuous-tone data 2 i.e. a continuous-tone picture is installed in front of the cylinder 1, and a scanning element 10 for scanning the line data i.e. the line drawings or letters 4 is situated in front of the cylinder 3. A recording element 12 is arranged in front of the recording cylinder 5. The scanning elements 9 and 10, as well as the recording element 12, are caused to perform a feed displacement which is axial with respect to the cylinders, by means of the spindle 13 which is driven by the motor 11. The scanning screen as well as the half-tone recording screen, are the consequence of the interaction between the rotary displacement, the feed and a pulse generator 8 which is situated on the same spindle as the cylinders 1, 3, 5. Apart from the screen cycle, the pulse generator 8 also generates a pulse which indicates the start of each peripheral line. Both cycles are fed via conductors 20 and 21, respectively, to a multiplier 19 which prepares the cycle 20a for a screen calculator 17 wherein the shape and size of the screen dots which are to be recorded are generated in accordance with the scanning values of the scanner 9. The scanning values of the scanning element 9 first traverse a colour calculator 15 operating in an analogue or digital mode, which performs the colour correction. The screen calculator 17 operates in digital mode. In the case of an analog color calculation the values corrected in the colour calculator 15 are digitalised beforehand in an A/D-converter 16. The screen cycle from conductor 20 as well as the line-start cycle from conductor 21 are furthermore also fed to the circuit 14, whereof exemplifying circuitry will be described in particular with reference to FIG. 4.

In modern electronic apparatus for production of colour separations, the size and shape of the half-tone dots are generated in the screen calculator 17 and recorded by means of several separately energisable recording beams, e.g. as described in U.S. Pat. Nos. 3,725,574 and 3,657,472. Due to the complex and varied structure of the half-tone dots, the number of recording beams within a scan line width is greater as a rule in their case than would be needed for the inventive improvement in line reproduction.

The circuit 18 wherein the screen data and the line data meet, for this reason advantageously comprises logic switching elements which upon incorporation of line data combine the recording beams by groups, for example into three groups of two recording beams each, or two groups of three recording beams each. Switchable grouping is also possible for different applications.

Figure 2:
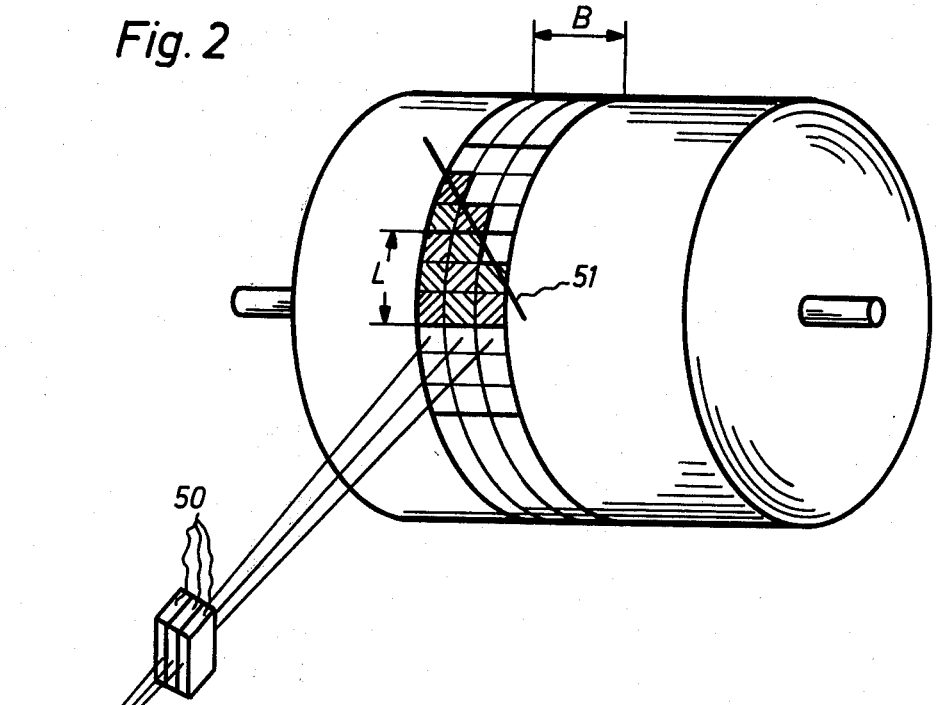
FIGS. 2 and 3 show examples of the improvement on different outlines.
Figure 3:
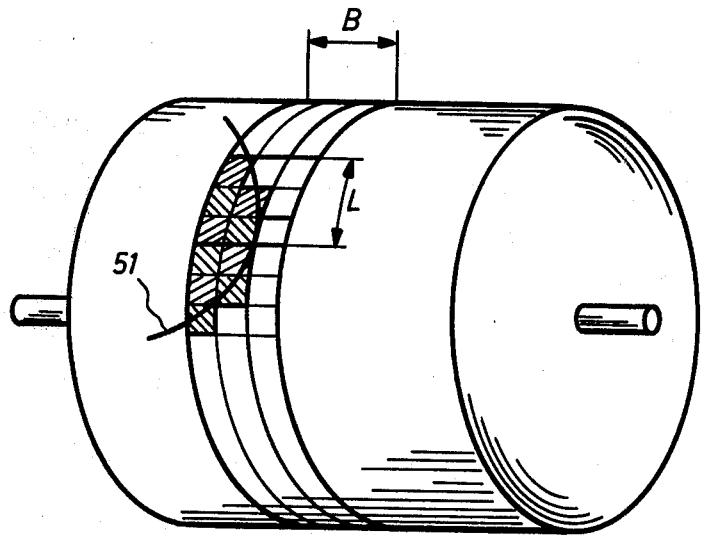

On differently shaped outlines 51, FIGS. 2 and 3 illustrate how the improvement in line recording is established. For example within a recording line width B, three recording beams are situated, which may be energised separately. The separate beams may advantageously consist of groups of combined recording beams of a multi-beam recording system for production of half-tone screen dots, e.g. as described in U.S. Pat. No. 3,725,574. Along the length L of a half-tone screen dot spacing, these recording beams may be energised three times, e.g. by a circuit 14, so that nine areas may be addressed separately within a screen section B×L. It is apparent that the outline shapes 51 picked empirically as examples in FIGS. 2 and 3 are reproduced with improved resolution within the scope of the invention by particular dot patterns within each screen section B×L. To clarify matters, three light modulators 50 and the light source 49 are also illustrated in FIG. 2.

Figure 4:
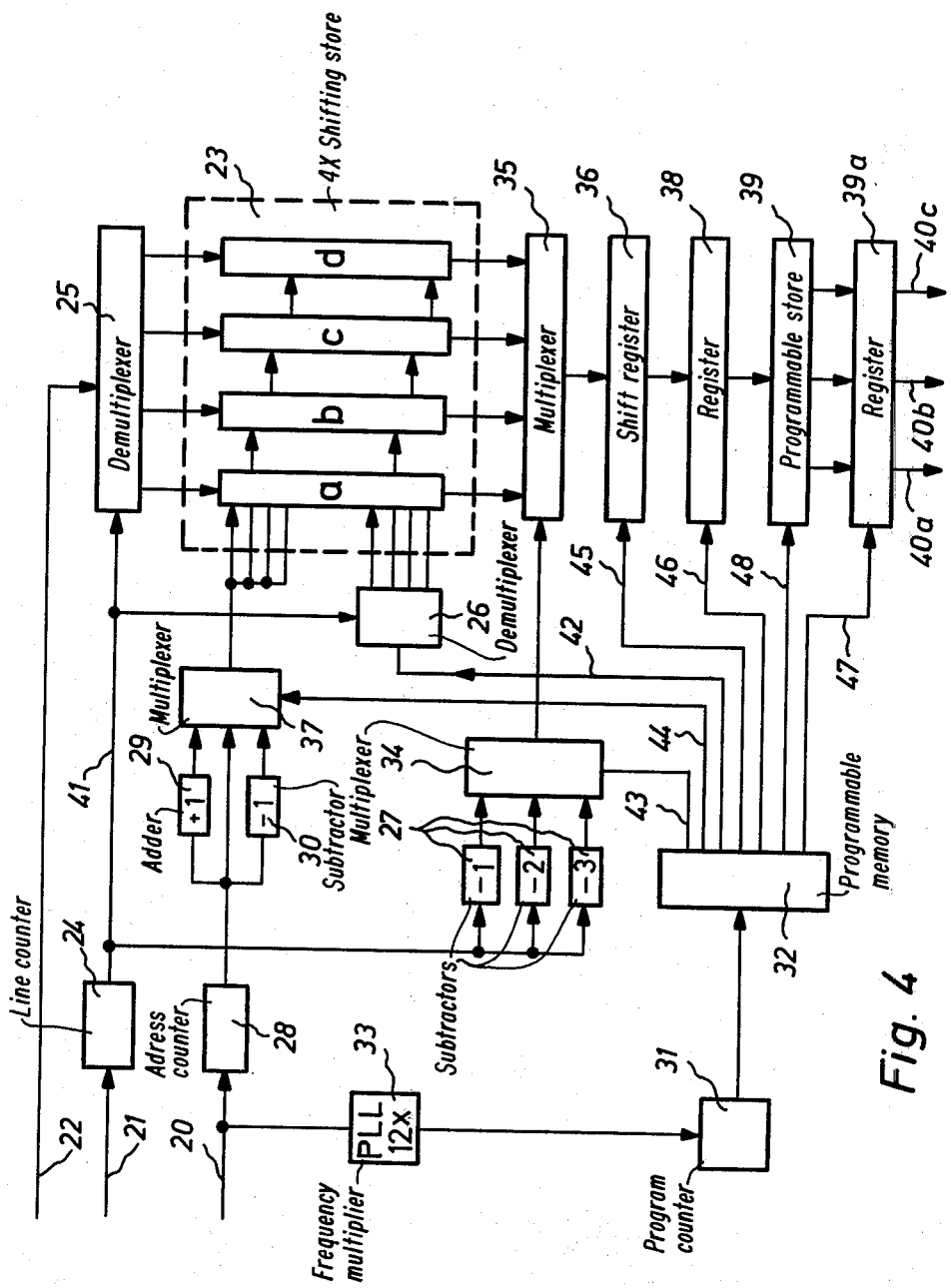
FIG. 4 shows an example of a circuit for improving line recording.

An example for circuit 14 (FIG. 1) for securing the dot patterns from the data of the momentary dot environment during line recording, is described with reference to FIG. 4. The exemplifying circuitry is again based on the fact that a screen division (B×L in FIG. 2) is subdivided into 3×3 separate areas. The fundamental mode of operation is the following: the line data coming from the line scanner 10 (FIG. 1) travels via conductor 22 and a demultiplexer 25 into a fourfold shifting store 23a to 23d which in each instance stores the values of four consecutive scanned lines, in such manner that a scanned line is present in each memory section. Three parts of the memory hold the environmental data of the dot to be analysed in readiness, whilst the next line scanned is entered in the fourth part. The dot environment data available in the three storage sections charged in each case with adjacent image lines has co-ordinated with it via a read-only store 39 a particular pattern of the dot which is to be recorded by the recording element 12. The read-only store is so programmed, that this dot pattern is matched in optimum manner to the outline picked up by the scanning operation and improves its reproduction in the inventive form.

A line counter 24, such for example as that supplied in commerce by Texas Instruments under Type no. SN 74,293, controls the cyclic switching of the shifting store 23a to 23d via a 2-bit line 41 (e.g. 4×semi 4200 supplied by Electronic Memories and Magnetics), by determining via a demultiplexer 25 the line data are to be inserted. Furthermore, it controls the read pulse which arrives from the control system via conductor 42, which it appropriately switches to the shifting store via another demultiplexer 26 (e.g. SN 74,130 supplied by Texas Instruments). At the same time, the line counter 24 renders available, via 3 subtractors 27 (e.g. SN 7,482 supplied by Texas Instruments) which constantly subtract by 1, 2 and 3 respectively and via a multiplexer 34 (e.g. SN 74,153 by Texas Instruments), the addresses for the lines from which a read-out may be taken. The address counter 28 (e.g. 3×SN 74,293 by Messrs. Texas Instruments) driven at the scanning timing via conductor 20 by the pulse generator 8 (FIG. 1), together with an adder 29 (e.g. 3×SN 74,283 by Texas Instruments) which constantly adds 1 and with a subtractor 30 (e.g. 3×SN 74,283 by Texas Instruments) which constantly subtracts 1, prepares the three dot addresses of which a read-out may be taken.

Figure 5:
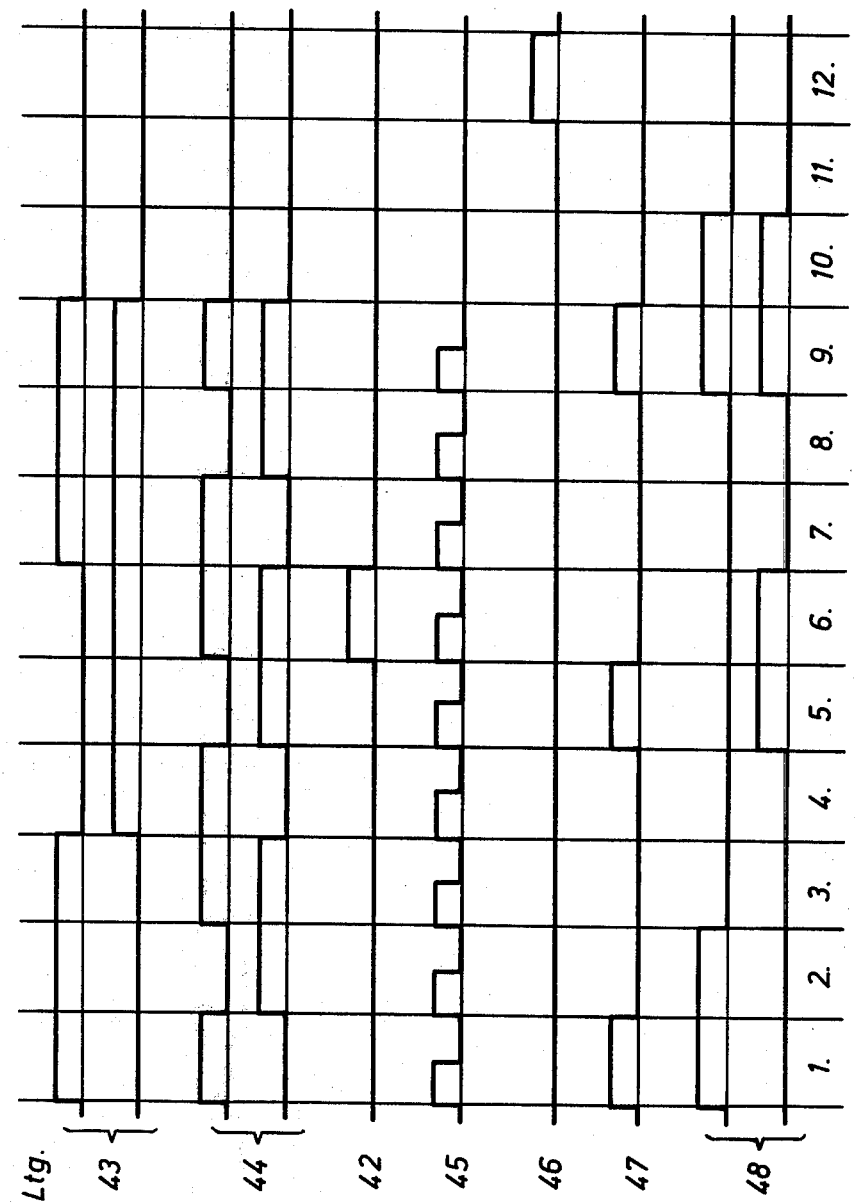
FIG. 5 shows a pulse diagram for the control system.

The control system is rigged for linear programme evolution and comprises a programme counter 31 (e.g. SN 7492 by Texas Instruments) and a programmable memory 32 (e.g. 2×SN 74,188 by Texas Instruments). This contains the microprogramme for the control sequence whose pulse diagram is shown in FIG. 5. The cycling or timing of the control system occurs at a multiple of the scanning frequency (e.g. 12 times in this case), which is generated via a frequency multiplier 33 in PLL connection (e.g. described in RC application report ICAN 6101).

The factor 12 provides twelve programme steps for the control system for the period of a scanning cycle. During these programme steps, the control system consecutively switches the three shifting store parts which just contain the full ambient line data via line 43 (2-bit) and the multiplexer 34, and via another multiplexer 35 (e.g. SN 74,153 by Texas Instruments) to a shift register 36 (e.g. 3×SN 7495A) and within each line selects three dots via conductor 44 (2-bit) and via a multiplexer 37 (e.g. 6×74,153 by Texas Instruments), so that nine dot data appear consecutively at the input side of the shift register 36. For each dot datum, the control system delivers a pulse via conductor 45 which induces the shift register to shift so that after the nine shifting actions, the data are available in parallel at the output side of the shift register. A charging pulse is applied by the control system to a post-connected register 38 (e.g. 2×SN 74,174 by Texas Instruments) via conductor 46, so that the 9-bit data are transferred into the register 38 so that they may be available therein for generating the dot pattern for the next scanning period, whereas the shift register 36 is cleared for collection of the next data. The address for the programmable store 39 is formed by the data stored in the register 38, together with a 2-bit datum arriving from the control system via conductor 48. The address part coming from the register 38 remains constant during the period of the recording cycle for a complete dot (B×L), whereas the address part arriving via conductor 48 from the control system, is switched three times with a dot. The dot which is to be recorded is thus also resolved into three lines in peripheral direction, so that the improvement also becomes effective in the peripheral direction. After intermediate storage, by means of a pulse on conductor 47 in another register 39a (e.g. type SN 74,175 by Texas Instruments), a driving signal for the circuit 18 (FIG. 1) is ready at its output terminals 40a to 40c.

A pulse diagram which shows the chronological evolution of the output pulses from the programmable store 32 is shown for clarification in FIG. 5, for the exemplifying programme specified.

Figure 6:
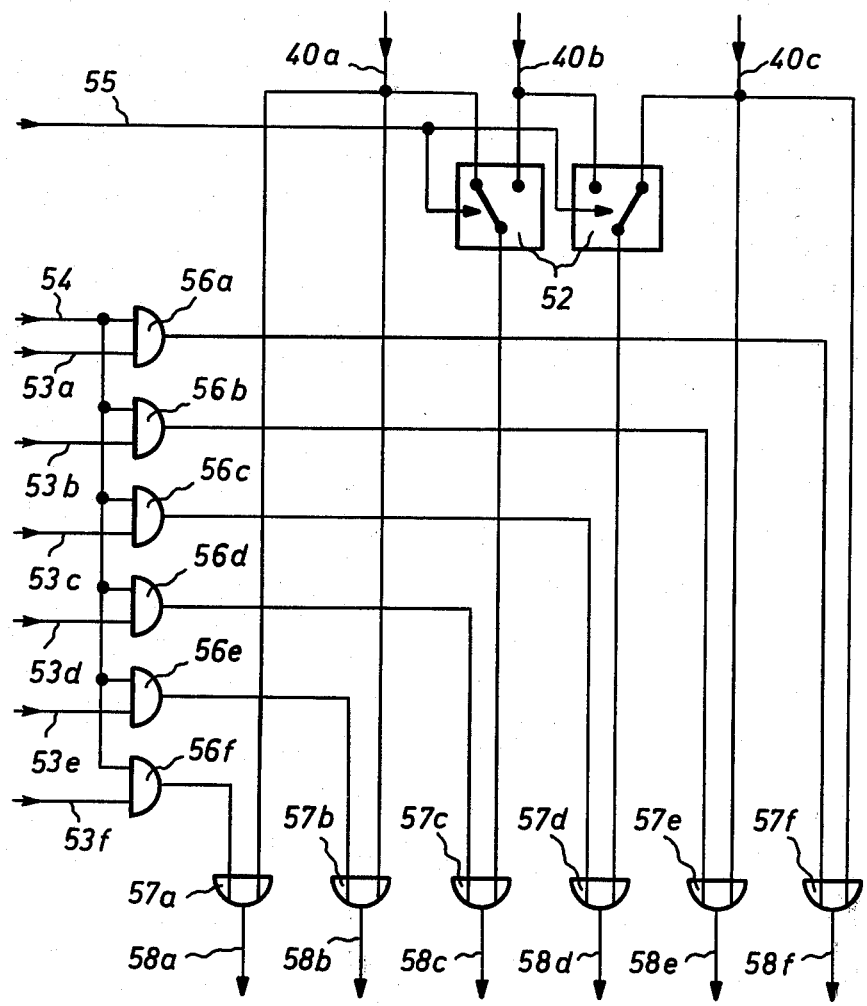
FIG. 6 shows an exemplifying circuit for a switching circuit.

FIG. 6 shows an example of the circuit 18 (FIG. 1) which combines screen signals and improved line signals prior to recording in appropriate manner. As an example the basis again adopted is that six recording beams are present. For example, these may be light beams which under modulation by light modulators 50 (FIG. 2) record on photosensitive film. The light modulators are controlled via six conductors 58a to 58f. These conductors correspond to outputs of six OR gates 57a to 57f at whose input terminals are confluent the screen data of the output conductors of the AND gates 53a to 53f and the improved line data from the conductors 40a to 40c (FIG. 4). The screen datum is always applied at one input terminal of the AND gates 53a to 53f; the other input terminals are arranged in parallel on conductor 54. The screen datum is or is not suppressed in accordance with the invention, depending on which logic signal is applied on conductor 54.

Two electronic reversing switches 52, illustrated as mechanical switches in this case to simplify matters, may switch the grouping of the six recording signals 57a to 57f by energisation of the switches 52 via conductor 55 at will into three groups each comprising two adjacent recording beams or into two groups each comprising three adjacent recording beams.

We claim:

1. A process for recording line data and screened half-tone pictures comprising the steps of:
    (a) scanning a continuous-tone picture by image lines;
    (b) simultaneously scanning line data by image lines with the same line resolution as the scanning of the continuous-tone picture;
    (c) color correcting and digitising the signal obtained by scanning the continuous-tone picture;
    (d) generating a first signal representing different screen dot sizes and forms from said digitised signal obtained from the scanning of the continuous-tone picture;
    (e) generating a second signal for recording the line data at a higher resolution by storing several adjacent image lines obtained from the scanning of the line data;
    (f) generating a second signal for recording the line data at a higher resolution than the scanning resolution by comparing the density value of each scanned picture dot of the stored line data with the density values of surrounding picture dots and selecting a dot pattern matched in an optimum manner to the second signal from a plurality of dot patterns stored in said higher resolution; and
    (g) recording the scanned half-tone picture and line data on a recording medium by separately energising a plurality of recording beams by said first signal to reproduce the half-tone picture and by said second signal to record said line data with improved resolution, said second signal having preference over said first signal.

2. A process as claimed in claim 1, including switching adjacent recording beams in parallel by groups in respect of energisation by said second signal.

* * * * *